A. B. Earle,
Grain Drill.
No. 11,829. Patented Oct. 24, 1854.
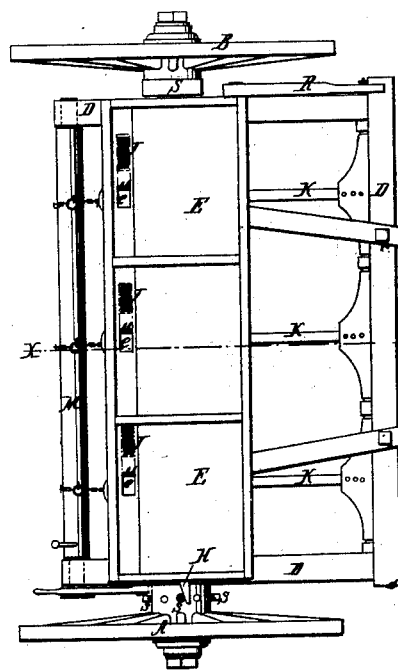
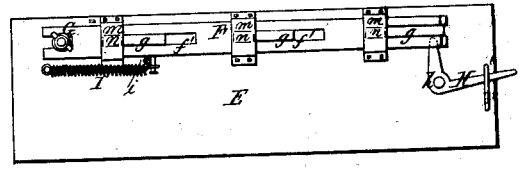
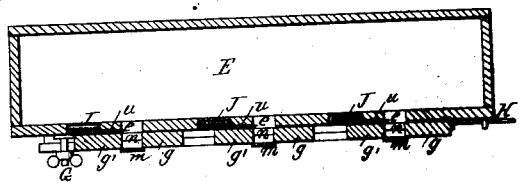
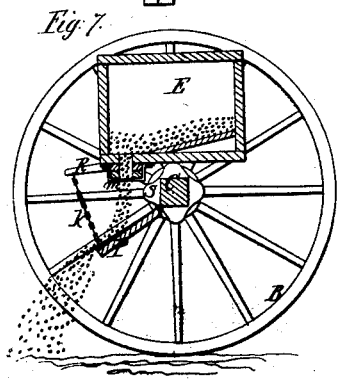
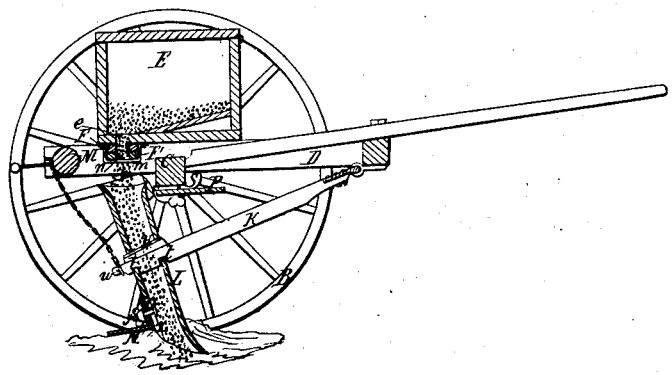

UNITED STATES PATENT OFFICE.

ABSALOM B. EARLE, OF FRANKLIN, NEW YORK.

IMPROVEMENT IN SEED-PLANTERS.

Specification forming part of Letters Patent No. 11,829, dated October 24, 1854.

*To all whom it may concern:*

Be it known that I, ABSALOM B. EARLE, of Franklin, in the county of Delaware and State of New York, have invented certain new and useful Improvements in Machines for Sowing Grain, of which the following is a full, clear, and exact description, reference being had to the accompanying drawings of the same, which make part of this specification, and in which—

Figure 1 represents a top view of a machine embracing my improvements. Fig. 2 represents a section of the same at the line $x\,x$ of Fig. 1. Fig. 3 represents a longitudinal section of the hopper and its slide detached from the machine. Fig. 4 represents a view of the hopper turned bottom side uppermost. Fig. 5 represents a view in perspective of the two parts separated, which compose the reciprocating slide. Fig. 6 represents a view of the back of one of the drill-tubes; and Fig. 7 represents a section at the line $x\,x$ of Fig. 1, but showing the machine with the seed-tubes removed and adjusted for sowing seed broadcast.

The machine represented in the accompanying drawings is supported on two wheels, A and B, that turn on the opposite ends of an axle, C. Beneath the openings $e$ of the hopper E a reciprocating slide is fitted. This slide is composed of two parts, F and F', each of which is made with oblong openings $f$ and $f'$ and tongues $g$ and $g'$, so that when the two parts are put together the tongues $g$ will fit into the openings $f'$ of the lower part, F', and the tongues $g'$ into the openings $f$ of the upper part, F, in such a manner as to form perforations $n$ in the slide. This construction allows the two parts to be adjusted by sliding them lengthwise in opposite directions to increase or diminish the size of the openings $n$, as may be required. When properly adjusted they are held together by a clamp-screw, G. When the slide is drawn in the perforations $n$ in the slide for the reception of the seed are brought under the openings $e$ and over the plates $m$, and are filled with the seed, and when the slide is pushed out again the perforations $n$ are moved off the plates $m$ and the seed drops down. These motions of the slide are effected by a series of pins, $s$, inserted in the hub of the wheel A, which by the revolving of the latter turn a bell-crank, H, as they pass, which is secured by a pivot, $h$, to the under side of the hopper. One arm of the crank is attached to the slide, and the other is in a position to be struck by one of the pins $s$, so that each pin as it passes will turn the arm and move the slide outward to discharge the seed. As soon as each pin has passed the arm of the bell-crank the slide is instantly drawn back by a spring, I. By changing the number of the pins the vibrations of the slide are increased or diminished, to sow faster or slower. The pins $s$ are adapted to being inserted into and removed from the hub at will. In the joint of each opening $e$—that is, between the bottom of the hopper and the upper part of the slide—a small plate, $u$, is arranged, the end of which projects into the opening. Behind each plate is a spring, J, which constantly tends to press the plate into the opening $e$, as represented in Figs. 1 and 3. This spring-plate $u$ forms a yielding point, which, as the slide is moved suddenly back, prevents the seed resting on it from being caught in the joint and bruised or broken. The drag-bar K of each drill-tube is attached to the front beam of the frame D by hinge-joints. Each drill-tube L has an opening made in its front and rear sides, through which the end of the drag-bar is passed, and notched to the lower edges of the openings, and secured by a wedge, $v$, driven above it. A chain connects the projecting end $w$ of the drag-bar with the lifting apparatus, thus dispensing with the rib or flange usually formed on the drill-tube for that purpose.

I am aware that drill-tubes have been connected to drag-bars by means of lugs, brackets, braces, and screw-bolts, and that drill-tubes have been inserted into a beam attached to and parallel with the axle of the machine; but as it is the object of my invention to dispense with and supersede these devices, I do not claim them either separately or in connection.

I am also aware that a spring guard-plate has been adapted to a series of rotating discharging-cups, but not in such manner as to detain any excess of seed which the cup might contain and drop it into the next. To such a guard I make no claim.

What I claim as my invention, and desire to secure by Letters Patent, is—

1. Constructing the drag-bar and drill-tube and connecting them in the simple and substantial manner herein set forth.

2. The spring guard-plate fitted in each delivery-opening between the hopper and the slide to prevent the fracture or bruising of the seed when the slide is drawn suddenly back, as herein described.

In testimony whereof I have hereunto subscribed my name.

A. B. EARLE.

Witnesses:
P. H. WATSON,
PETER HANNAY.